US011702212B2

United States Patent
Zhu et al.

(10) Patent No.: US 11,702,212 B2
(45) Date of Patent: Jul. 18, 2023

(54) AIRCRAFT ENVIRONMENTAL CONTROL SYSTEM

(71) Applicant: Hamilton Sundstrand Corporation, Charlotte, NC (US)

(72) Inventors: Yonghua Zhu, Cork (IE); Catherine Thibaud, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 200 days.

(21) Appl. No.: 17/134,728

(22) Filed: Dec. 28, 2020

(65) Prior Publication Data

US 2021/0197974 A1 Jul. 1, 2021

(30) Foreign Application Priority Data

Dec. 31, 2019 (EP) .................................... 19220255

(51) Int. Cl.
*B64D 13/00* (2006.01)
*B64D 13/06* (2006.01)

(52) U.S. Cl.
CPC ...... *B64D 13/06* (2013.01); *B64D 2013/0618* (2013.01); *B64D 2013/0651* (2013.01); *B64D 2013/0688* (2013.01)

(58) Field of Classification Search
CPC ............ B64D 13/06; B64D 2013/0618; B64D 2013/0637; B64D 2013/0662; B64D 2013/0651; B64D 2013/0688; B01D 2257/504; B01D 2257/708; B01D 2259/40043; B01D 2259/402; B01D 2259/4575; B01D 2259/657; B01D 53/04; Y02C 20/40; Y02T 50/50

See application file for complete search history.

(56) References Cited

U.S. PATENT DOCUMENTS

| 5,323,624 | A | 6/1994 | Schwalm | |
|---|---|---|---|---|
| 7,797,962 | B2 * | 9/2010 | Kresser | B64D 13/06 62/401 |
| 10,017,257 | B2 | 7/2018 | Ludvik et al. | |
| 2003/0005719 | A1 * | 1/2003 | Mitani | B64D 37/32 62/271 |

(Continued)

FOREIGN PATENT DOCUMENTS

| EP | 3090950 A1 | 11/2016 |
|---|---|---|
| EP | 3466815 A1 | 4/2019 |

OTHER PUBLICATIONS

European Search Report for Application No. 19220255.4, dated Jun. 23, 2020, 7 pages.

*Primary Examiner* — Jacob M Amick
*Assistant Examiner* — Sherman D Manley
(74) *Attorney, Agent, or Firm* — Cantor Colburn LLP

(57) ABSTRACT

An aircraft environmental control system includes means for mixing and conditioning bleed air from a bleed air input and recirculation air from an aircraft interior to provide mixed, conditioned air to the aircraft interior. The system also includes a first contaminant removal device and a second contaminant removal device arranged in a path of at least part of the recirculation air, prior to the means for mixing and conditioning, and a valve (SV1) arranged to alternate flow of recirculation air through the first and second contaminant removal devices.

4 Claims, 1 Drawing Sheet

(56) References Cited

U.S. PATENT DOCUMENTS

| | | | |
|---|---|---|---|
| 2006/0162371 A1* | 7/2006 | Lui | B64D 13/06 |
| | | | 62/402 |
| 2018/0243685 A1 | 8/2018 | Henson et al. | |
| 2018/0265204 A1* | 9/2018 | Ludvik | B01D 53/0462 |
| 2019/0009912 A1* | 1/2019 | Matsui | B64D 13/02 |
| 2019/0100318 A1 | 4/2019 | Space et al. | |
| 2019/0135440 A1* | 5/2019 | Bruno | B64D 13/06 |
| 2021/0197975 A1* | 7/2021 | Zhu | B01D 53/0438 |
| 2021/0338870 A1* | 11/2021 | Pess | A61L 2/208 |
| 2022/0033092 A1* | 2/2022 | Bruno | B64D 13/06 |
| 2022/0048633 A1* | 2/2022 | Michalakos | A61L 9/14 |

\* cited by examiner

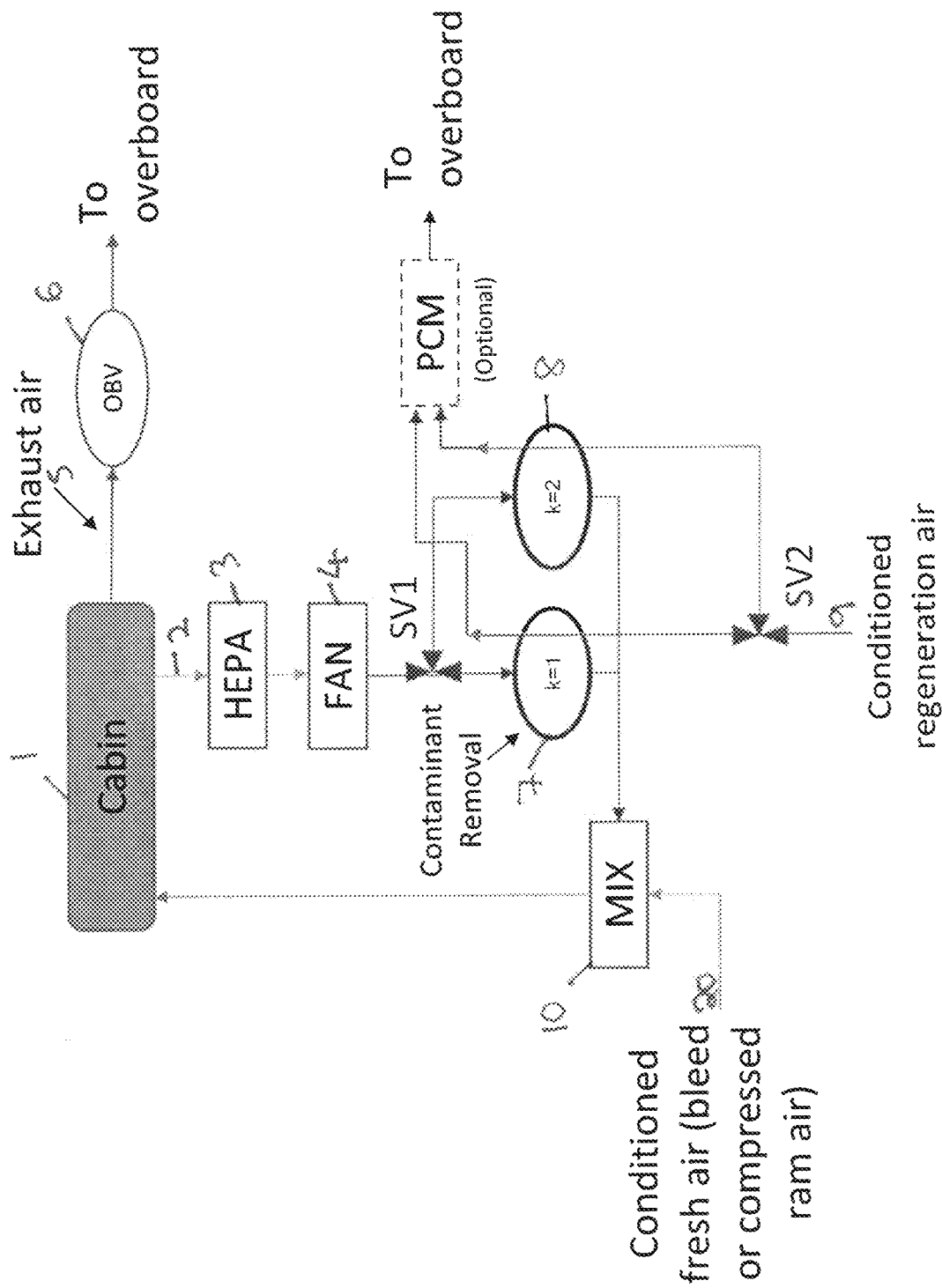

AIRCRAFT ENVIRONMENTAL CONTROL SYSTEM

FOREIGN PRIORITY

This application claims priority to European Patent Application No. 19220255.4 filed Dec. 31, 2019, the entire contents of which is incorporated herein by reference.

TECHNICAL FIELD

The present disclosure is concerned with environmental control systems for aircraft which provide pressurised and conditioned air to the aircraft cabin for the health and comfort of passengers and crew.

BACKGROUND

Environmental control systems (ECS) are provided in aircraft to provide pressurised and conditioned air to the aircraft cabin. Regulations provide for the minimum flow of conditioned air to be fed into the cabin per passenger. The Federal Aviation Authority (FAA) requires that fresh air flow rate to be at least 0.25 kg/min per passenger in order to dilute contaminants generated in the cabin, to provide thermal comfort and oxygen for occupants and to maintain cabin pressure. An ECS must be able to comply with such regulations while maximising efficiency in terms of power consumption but also minimizing overall size and weight of the ECS.

Generally, particularly in commercial aircraft, fresh air from the aircraft engine (bleed air) or compressed ambient air is used to provide the ECS air flow. The incoming air is, however, at a relatively high temperature and pressure and needs to be conditioned to the appropriate temperature and pressure before it is fed into the cabin. The way this is usually done is to use ambient air, brought into the system via an air intake device, such as a scoop. This air—so-called RAM air—is used in a system of heat exchangers to cool the bleed air or compressed ambient air. The RAM air is firstly used in a main heat exchanger (MHX) as a heat sink to cool the bleed air or compressed ambient air and then in a primary heat exchanger (PHX). By the time the RAM air has passed through the MHX, its temperature has already increased substantially. The ECS of an aircraft consumes the majority of the non-propulsive power. Much of this energy is consumed in extracting and conditioning the bleed air.

In order to save fuel consumption, systems have been developed that use a combination of bleed air and recirculation conditioned air from the aircraft cabin. This makes use of the energy that went into conditioning the air when it was supplied to the cabin from the exhausted air. A mix of bleed air and already conditioned, exhausted air therefore reduces fuel consumption as less fresh air needs to be conditioned in generating new conditioned air to be supplied to the cabin. A 50:50 mix of bleed air and recirculated air is generally used. There is a desire to further reduce the proportion of fresh (or bleed) air and use more recirculation air, to further reduce fuel consumption.

If more recirculation air is used in the air being supplied to the cabin in an ECS, it is important that contaminants, e.g. $CO_2$/volatile organic compounds (VOCs), are removed from the recirculated air.

There is great pressure on the aircraft industry to improve energy efficiency and to reduce emissions and there is, therefore, a need for a more energy efficient ECS. It would be desirable to reduce the amount of bleed air required by the ECS, and make more use of recirculation air taking into account the need to control contamination in that air.

SUMMARY

According to one aspect, there is provided an aircraft environmental control system, comprising means for mixing and conditioning bleed air from a bleed air input and recirculation air from an aircraft interior to provide mixed, conditioned air to the aircraft interior, the system further comprising a first contaminant removal device and a second contaminant removal device arranged in a path of at least part of the recirculation air, prior to the means for mixing and conditioning, and a valve arranged to alternate flow of recirculation air through the first and second contaminant removal devices.

In a preferred arrangement, the system further comprises means for passing regeneration air through the contaminant removal devices to desorb the one or more contaminants for purging from the system, and a valve for alternately passing the regeneration air through the first and second contaminant removal devices, the valves being arranged such that when recirculation air flows passing through one of the first and second contaminant removal devices, regeneration air flows passing through the other of the contamination removal devices.

Also provided is a method of providing conditioned air to an aircraft interior comprising mixing and conditioning bleed air and recirculation air from the aircraft to provide mixed conditioned air to the aircraft interior, the method including removing one or more contaminants from the recirculation air, prior to mixing, by passing the recirculation air through one of two contaminant removal devices and alternating the flow of recirculation air from passing through one of the contaminant removal devices to passing through the other contaminant removal device.

The method preferably further includes regenerating contaminant removing material of the contaminant removal devices by passing conditioned regeneration air through the devices to desorb the contaminant adsorbed by the devices.

Energy can also be recovered from the regeneration air after regeneration and/or the air can be exhausted overboard.

BRIEF DESCRIPTION OF THE DRAWING

FIG. 1 is a schematic view of an environmental control system according to the disclosure.

DETAILED DESCRIPTION

FIG. 1 shows an embodiment of an ECS according to the disclosure. It is envisaged that other configurations could fall within the scope of the invention as defined by the claims.

ECS are known that combine recirculation air and conditioned bleed air to supply conditioned air to an aircraft cabin. These will not, therefore, be described in detail and the details of such systems are not shown in the drawing.

FIG. 1 shows an aircraft cabin 1. Conditioned air is provided to the passenger cabin, the cockpit and/or cargo areas etc. from an environmental control system (ECS). Bleed air 20 and some recirculation air (i.e. conditioned air recirculated from the aircraft) are mixed in a mixer 10 and conditioned using a known arrangement of valves and heat exchangers to provide suitably conditioned air to the aircraft interior. The recirculated air 2 is generally filtered (at HEPA 3) and conveyed to the mixer via a fan 4. Conditioned air from the aircraft that is not recirculated is exhausted overboard from the aircraft, e.g. via an overboard valve (OBV) 6. As mentioned above, in conventional systems, recirculated air and fresh (bleed) air will be mixed in equal proportions.

According to this disclosure, to allow more recirculated air to be used in the ECS mix (and, therefore, less fresh air) the recirculation air 2 exiting the aircraft, or a portion of it, is passed through one of two or more parallel contaminant removal devices 7, 8 arranged to remove contaminants from the air before it is mixed in the ECS. The devices 7, 8 will remove contaminants from the air and the purified air is then provided to the mixer 10 (as before). A split valve (SV1) is controlled to regulate the flow of recirculation air passing through the contaminant removal devices 7, 8.

The example shown includes two contaminant removal devices—first, 7, and second, 8 but different numbers of devices may be used. The composition of the devices can be selected to remove contaminants such as, but not limited to, CO2 or VOC.

The two contaminant removal devices 7, 8 are arranged to run alternately, i.e. the recirculation air is caused, by operation of the split valve SV1, to pass through either the first device 7 or the second device 8.

The contaminant removal devices 7, 8 are made to be regenerative as described further below. This enables air from the system to be used to desorb the contaminants collected by the devices to the atmosphere, to regenerate the adsorbing materials.

The system is configured such that while recirculation air is passing through the first contaminant removal device 7, the second device 8 is being regenerated, and vice versa. To realise this, a second split valve SV2 controls the flow of conditioned regeneration air 9 alternately passing through the contaminant removal devices.

The regeneration air 9 may be part of the processed air after the contaminant removal devices 7, 8, heated if necessary, or, alternatively, could be conditioned RAM air or conditioned air from another source. The system is flexible in that air from various sources can be used in the regeneration loop.

In a preferred arrangement, the system can be configured to enable energy to be recovered from the exhausted regeneration air—i.e. after it has been passed through the contaminant removal devices to regenerate them. The energy can be recovered from this air using an energy storage device, such as phase change material (PCM). The recovered energy could, e.g. be used to pre-warm the regeneration air so that less heat energy is needed downstream of regeneration air conditioning.

The decision as to whether or not to provide such an energy recovery feature will need to balance the energy cost of the additional weight of the energy storage device (e.g. PCM) with the amount of useful energy recovery that can be achieved.

There is no risk of leakage between the processing air flow and the regeneration air flow as they are in different loops and so the pressure of the regeneration air could be lower than that of the processing air. Thus, the regeneration air can be less energy/power intensive to process. Also, a greater quantity of regeneration air could be used to regenerate the contaminant removal devices to improve performance. Further, if the regeneration process is driven by conditioned air from another source, e.g. conditioned RAM air, there will be no waste of filtered air.

Using such an arrangement, fuel savings can be achieved due to less fresh (or bleed) air being used in the ECS. Further, contaminant removal is continuous and effective and the contaminant removal devices can be more quickly regenerated without any downtime. The system is compact in that it makes multiple use of the same air stream. The system can be designed to handle different contaminants according to the conditions.

The invention claimed is:

1. An aircraft environmental control system, comprising:
    means for mixing and conditioning bleed air from a bleed air input and recirculation air from an aircraft interior to provide mixed, conditioned air to the aircraft interior;
    a first contaminant removal device and a second contaminant removal device arranged in a path of at least part of the recirculation air, prior to the means for mixing and conditioning;
    a first split valve (SV1) arranged to alternate flow of recirculation air through the first and second contaminant removal devices;
    means for passing conditioned regeneration air through the contaminant removal devices to desorb the one or more contaminants for purging from the system;
    a second split valve (SV2) for alternately passing the conditioned regeneration air through the first and second contaminant removal devices, the valves being arranged such that when recirculation air flows passing through one of the first and second contaminant removal devices, conditioned regeneration air flows passing through the other of the contamination removal devices; and
    an energy storage device configured to recover energy from the conditioned regeneration air passing therethrough after it has passed through the contamination removal device for desorption.

2. A method of providing conditioned air to an aircraft interior comprising:
    mixing and conditioning bleed air and recirculation air from the aircraft to provide mixed conditioned air to the aircraft interior;
    removing one or more contaminants from the recirculation air, prior to mixing, by passing the recirculation air through one of two contaminant removal devices and alternating the flow of recirculation air from passing through one of the contaminant removal devices to passing through the other contaminant removal device;
    regenerating contaminant removing material of the contaminant removal devices by passing conditioned regeneration air through the devices to desorb the contaminant adsorbed by the devices, wherein the first device is regenerated while recirculation air passes through the second device and vice versa; and
    storing energy from the regeneration air after it has passed through the contaminant removal device to desorb the contaminant.

3. The method of claim 2, wherein the conditioned regeneration air is conditioned RAM air.

4. The method of claim 2, further comprising exhausting the regeneration air passed through the contaminant removal devices from the system.

\* \* \* \* \*